(12) United States Patent
Peiffer et al.

(10) Patent No.: US 9,440,420 B2
(45) Date of Patent: *Sep. 13, 2016

(54) POLYURETHANE POLYMERS

(75) Inventors: Evelyn Peiffer, Leverkusen (DE); Mathias Matner, Neuss (DE)

(73) Assignee: Covestro Deutschland AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/124,477

(22) PCT Filed: Jun. 5, 2012

(86) PCT No.: PCT/EP2012/060592
§ 371 (c)(1),
(2), (4) Date: Jan. 16, 2014

(87) PCT Pub. No.: WO2012/168236
PCT Pub. Date: Dec. 13, 2012

(65) Prior Publication Data
US 2014/0120354 A1 May 1, 2014

(30) Foreign Application Priority Data
Jun. 8, 2011 (DE) .......... 10 2011 077 213

(51) Int. Cl.
| B32B 27/40 | (2006.01) |
| C09J 175/04 | (2006.01) |
| C09D 175/04 | (2006.01) |
| C08G 18/40 | (2006.01) |
| C08G 18/63 | (2006.01) |
| C08G 18/71 | (2006.01) |

(52) U.S. Cl.
CPC ............ B32B 27/40 (2013.01); C08G 18/409 (2013.01); C08G 18/63 (2013.01); C08G 18/632 (2013.01); C08G 18/718 (2013.01); C09D 175/04 (2013.01); C09J 175/04 (2013.01); Y10T 428/31551 (2015.04)

(58) Field of Classification Search
CPC C08G 18/631; C08G 18/632; C08G 18/718; C08G 18/409; C09D 175/04; C09J 175/04
USPC .......... 428/423.1; 521/154; 524/588; 528/29
See application file for complete search history.

(56) References Cited

U.S. PATENT DOCUMENTS

| 3,294,711 A | 12/1966 | Von Bonin |
| 3,627,722 A | 12/1971 | Seiter |
| 3,632,557 A | 1/1972 | Brode at al. |
| 4,089,835 A | 5/1978 | Konig et al. |
| 4,146,585 A | 3/1979 | Ward et al. |
| 4,230,823 A | 10/1980 | Alberts et al. |
| 4,260,530 A | 4/1981 | Reischl et al. |
| 4,324,716 A | 4/1982 | Reischl et al. |
| 4,345,053 A | 8/1982 | Rizk et al. |
| 4,590,219 A * | 5/1986 | Nissen et al. ............ 521/51 |
| 4,895,878 A | 1/1990 | Jourquin et al. |
| 5,158,922 A | 10/1992 | Hinney et al. |
| 6,884,852 B1 | 4/2005 | Klauck et al. |
| 7,179,882 B2 | 2/2007 | Adkins et al. |
| 2001/0031848 A1 | 10/2001 | Windmueller et al. |
| 2002/0100550 A1 | 8/2002 | Mahdi et al. |
| 2005/0027067 A1 | 2/2005 | Nefzger et al. |
| 2005/0137275 A1 | 6/2005 | Nefzger et al. |
| 2006/0135727 A1 | 6/2006 | Nefzger et al. |
| 2007/0055035 A1 | 3/2007 | Ludewig et al. |
| 2008/0057316 A1 * | 3/2008 | Landon et al. ............ 428/423.1 |
| 2011/0130512 A1 | 6/2011 | Ludewig et al. |
| 2012/0245241 A1 * | 9/2012 | Peiffer et al. .............. 521/154 |

FOREIGN PATENT DOCUMENTS

| DE | 1 745 526 A1 | 3/1972 |
| DE | 2638759 A1 | 3/1978 |
| DE | 19908562 A1 | 10/1999 |
| DE | 102007058344 A1 | 6/2009 |
| DE | 102008038488 A1 | 2/2010 |
| EP | 0008444 A2 | 3/1980 |
| EP | 0070475 A2 | 1/1983 |
| EP | 0250351 A2 | 12/1987 |
| EP | 0372561 A2 | 6/1990 |
| EP | 0 397 036 A2 | 11/1990 |
| EP | 0654302 A1 | 5/1995 |
| EP | 0732348 A1 | 9/1996 |
| EP | 1093482 B1 | 4/2001 |
| EP | 1136495 A2 | 9/2001 |
| EP | 1505082 A2 | 2/2005 |
| EP | 1541606 A1 | 6/2005 |
| EP | 1671994 A1 | 6/2006 |
| EP | 1924621 B1 | 5/2008 |
| EP | 1995261 A1 | 11/2008 |
| EP | 2046861 A1 | 4/2009 |
| WO | WO-2007025668 A1 | 3/2007 |
| WO | WO2008/013731 | 1/2008 |

OTHER PUBLICATIONS

International Search Report for PCT/EP2012/060592 mailed Sep. 20, 2012.
International Preliminary Report on Patentability for PCT/EP2012/060592.mailed 2013.
International Preliminary Report on Patentability in English for PCT/EP2012/060592, date of issuance Dec. 10, 2013.
U.S. Appl. No. 14/124,487, filed Dec. 6, 2013, Peiffer et al.

* cited by examiner

Primary Examiner — Thao T Tran
(74) Attorney, Agent, or Firm — Drinker Biddle & Reath LLP

(57) ABSTRACT

The present invention relates to polyurethane polymers, a process for their preparation and their use as binders for adhesives, coatings or foams.

13 Claims, No Drawings

POLYURETHANE POLYMERS

CROSS-REFERENCE TO RELATED APPLICATIONS

This application is a national stage application (under 35 U.S.C. §371) of PCT/EP2012/060592, filed Jun. 5, 2012, which claims benefit of German application 10 2011 077 213.8, filed Jun. 8, 2011.

The present invention relates to non-aqueous polyurethane polymers, a process for their preparation and their use as binders for adhesives, coatings or foams.

Alkoxysilane-functional polyurethanes which crosslink via a silane polycondensation have been known for a long time. An overview article on this subject is to be found e.g. in "Adhesives Age" April 1995, page 30 et seq. (authors: Ta-Min Feng, B. A. Waldmann). Such alkoxysilane-terminated moisture-curing one-component polyurethanes are increasingly being used as flexible coating, sealing and adhesive compositions in the building industry and in the automobile industry.

According to U.S. Pat. No. 3,627,722 or DE-A 1 745 526, such alkoxysilane-functional polyurethanes can be prepared by e.g. reacting polyether polyols with an excess of polyisocyanate to give an NCO-containing prepolymer, which is then in turn reacted further with an amino-functional alkoxysilane.

EP-A 0 397 036, DE-A 19 908 562 (corresponds to EPA 1 093 482) and US-A 2002/0100550 describe further different routes for the preparation of alkoxysilane-terminated polymers. According to these publications, in each case high molecular weight polyethers having an average molecular weight of 4,000 g/mol or higher are employed.

EP-A 0 070 475 describes the preparation and use of alkoxysilane-terminated polymers starting from hydrogen-acid prepolymers by termination with NCO-functional alkoxysilanes. Polyols having a molecular weight of 500-6,000 g/mol are used for the prepolymer synthesis. The polymers described therein are employed as binders in sealant formulations, that is to say flexible systems.

An analogous process is described in the application DE-A 10 2007 058 344.

The possibility of arriving at prepolymers of particularly low viscosity by using isocyanate-functional alkoxysilane units is disclosed inter alia in U.S. Pat. No. 4,345,053. In this, an OH-functional prepolymer is terminated by an isocyanate-functional alkoxysilane, which in the end means the saving of one urea group per termination. Nevertheless, the OH-functional prepolymer still comprises urethane groups which result from the prelengthening of a polyether polyol with diisocyanate. As is likewise disclosed in EP-A 0 372,561, these can be saved by employing specially prepared long-chain polyethers having a low degree of unsaturation and polydispersity. Nevertheless, in the stoichiometric reaction of such isocyanate-functional alkoxysilane units binders are obtained which, because of inadequate masking, above all if very long-chain polyethers are used, cannot crosslink adequately during curing. This leads to very soft polymers having a high surface tackiness and a lack of resilience, or a high plastic deformability.

EP-A 1 924 621 (corresponds to WO2007025668) describes the preparation and use of alkoxysilane-terminated polymers starting from polyether polyols by termination with NCO-functional alkoxysilanes. Polyols having a molecular weight of 3,000-20,000 g/mol are used for the synthesis. The polymers described therein are employed as binders in sealant formulations, that is to say flexible systems.

All of these alkoxysilane-terminated systems form, after curing, flexible polymers having a relatively low strength and a high elongation at break. DE-A 1 745 526 describes tensile strengths in the range of from 3.36 kg/cm$^2$ to 28.7 kg/cm$^2$ for polyoxypropylene glycol-based polymers. Only with crystallizing polycaprolactones are high strengths which are adequate for structural gluings achieved.

However, these systems have the disadvantage that they are very highly viscous or even solid at room temperature and therefore can only be processed hot.

The field of use of the abovementioned applications is accordingly limited on the one hand to sealants and flexible adhesives and on the other hand to highly viscous or solid systems, which can only be processed hot.

The present invention was therefore based on the object of providing non-aqueous, alkoxysilane-terminated polymers which are liquid at room temperature and achieve a high cohesive strength when cured, so that adhesives which render possible structural gluing can be formulated using them.

It has now been found that such alkoxysilane-terminated polymers having the required properties can be prepared by using polymer polyols having organic fillers dispersed therein and reacting these with an isocyanate-functional alkoxysilane.

The invention therefore provides polymers modified with alkoxysilane groups, which are obtainable by reaction
 a) of compounds or mixtures of compounds having isocyanate-reactive groups which comprise at least 5 wt. % of organic filler dispersed therein
with
 b) an isocyanate-functional alkoxysilane compound of the general formula (I):

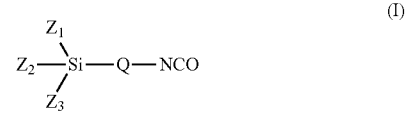

wherein
 $Z^1$, $Z^2$ and $Z^3$ are identical or different $C_1$-$C_8$-alkoxy or $C_1$-$C_8$-alkyl radicals, which can also be bridged, but wherein at least one $C_1$-$C_8$-alkoxy radical must be present on each Si atom,
 Q is an at least difunctional linear or branched organic radical, preferably an alkylene radical having 1 to 8 carbon atoms.

In this context, the reaction of b) with a) can preferably be carried out in a ratio of from 0.8:1.0 to 1.5:1.0 (NCO: isocyanate-reactive hydrogen).

The compounds according to the invention are non-crystallizing substances which are liquid at room temperature.

All the polymer polyols having organic fillers dispersed therein which are known to the person skilled in the art can be used as part a). Such polymer polyols can be both polyester and polyether polyols. Preferably, polyether polyols having organic fillers dispersed therein, such as, for example, addition products of toluylene-diisocyanate with hydrazine hydrate (PHD), as described in DE-A 2 638 759, U.S. Pat. No. 4,089,835 or U.S. Pat. No. 4,260,530, or copolymers of styrene and acrylonitrile (SAN), as described in U.S. Pat. No. 7,179,882, EP-A 0 008 444 or U.S. Pat. No. 4,895,878, are employed. Polyester polyols having organic fillers dispersed therein are described in EP-A 1 505 082, EP-A 1 541 606, EP-A 1 671 994, EP-A 0 250 351, U.S. Pat. No. 3,294,711.

Part a) comprises at least 5 wt. % of dispersed organic filler, preferably at least 10 wt. % of dispersed organic filler, particularly preferably at least 20 wt. % of dispersed organic filler.

In addition to the polymer polyols having organic fillers dispersed therein, all the compounds known to the person skilled in the art which have isocyanate-reactive groups can also be employed as a proportion of part a). These can be, for example, low molecular weight, multifunctional, isocyanate-reactive compounds, such as aliphatic polyols, polythiols or polyamines, aromatic polyols, polythiols or polyamines, or can be higher molecular weight isocyanate-reactive compounds, such as polyether polyols, polyether amines, polycarbonate polyols, polyester polyols and polythioether polyols. Preferably, such isocyanate-reactive compounds have an average functionality of from 1 to 6, preferably 2 to 3.5 and particularly preferably from 2 to 3.

Preferably, part a) has on average a functionality of at least 2.0.

Alternatively, isocyanate-reactive polyurethane polymers such as are described, for example, in EP-A 0 070 475 and DE-A 10 2007 058 344 can be employed in part a), optionally also as a proportion.

In principle all monoisocyanates comprising alkoxysilane groups and having a molecular weight of from 140 g/mol to 500 g/mol are suitable as isocyanate-functional alkoxysilane compounds of the general formula (I). Examples of such compounds are isocyanatomethyltrimethoxysilane, isocyanatomethyltriethoxysilane, (isocyanatomethyl)methyldimethoxysilane, (isocyanatomethyl)methyldiethoxysilane, 3-isocyanatopropyltrimethoxysilane, 3-isocyanatopropylmethyldimethoxysilane, 3-isocyanatopropyltriethoxysilane and 3-isocyanatopropylmethyldiethoxysilane. The use of 3-isocyanatopropyltrimethoxysilane is preferred here.

According to the invention it is also possible to use isocyanate-functional silanes which have been prepared by reaction of a diisocyanate with an amino- or thiosilane, such as are described in U.S. Pat. No. 4,146,585 or EP-A 1 136 495.

The reaction of b) with a) is preferably carried out in a ratio of from 0.8:1.0 to 1.5:1.0 (NCO:isocyanate-reactive hydrogen), particularly preferably in a ratio of from 1.0:1.0 to 1.5:1.0, very particularly preferably in a ratio of from 1.0:1.0 to 1.2:1.0. Preferably, the isocyanate is employed in an equimolar amount or in excess, such that the resulting polymers according to the invention are completely alkoxysilane-terminated. If necessary, the optimum ratio for a specific substance combination of b) and a) is to be determined by orientating preliminary experiments, which is a conventional procedure for the person skilled in the art.

If the ratios of amounts are chosen such that after the reaction of a) with b) has been carried out free NCO groups remain, these can then be taken up by reaction with compounds which are reactive towards isocyanates or by allophanation, as described, for example, in EP-A 1 924 621.

The reaction of part a) with part b) is preferably carried out in a temperature range of from 20° C. to 200° C., particularly preferably within from 40° C. to 120° C. and particularly preferably from 60° C. to 100° C.

This reaction can be accelerated by catalysis. Urethanization catalysts known per se to the person skilled in the art, such as organotin compounds or aminic catalysts, are possible for the acceleration. Organotin compounds which may be mentioned by way of example are: dibutyltin diacetate, dibutyltin dilaurate, dioctyltin dilaurate, dibutyltin bis-acetoacetonate and tin carboxylates, such as, for example, tin octoate. The tin catalysts mentioned can optionally be used in combination with aminic catalysts, such as aminosilanes or 1,4-diazabicyclo[2.2.2]octane.

Dibutyltin dilaurate is particularly preferably employed as the catalyst.

The reaction is continued until complete conversion of the isocyanate-reactive groups is achieved. The course of the reaction is appropriately monitored by checking the NCO content and is ended when the NCO content has fallen to <1 wt. %. This can be monitored by suitable measuring equipment installed in the reaction vessel and/or with the aid of analyses on samples taken. Suitable methods are known to the person skilled in the art. They are, for example, viscosity measurements, measurements of the NCO content, the refractive index or the OH content, gas chromatography (GC), nuclear magnetic resonance spectroscopy (NMR), infra-red spectroscopy (IR) and near infra-red spectroscopy (NIR). Preferably, the NCO content of the mixture is determined titrimetrically.

It is irrelevant whether the process is carried out continuously, e.g. in a static mixer, extruder or kneader, or discontinuously, e.g. in a stirred reactor.

The process is preferably carried out in a stirred reactor.

The invention also provides adhesives, coatings or foams based on the polymers according to the invention. These adhesives, coatings or foams crosslink under the action of moisture from the atmosphere via a silanol polycondensation. Preferably, the polymers according to the invention are employed in foams and adhesives, particularly preferably in adhesives which, according to the measurement method described in the experimental part, have a tensile shear strength of at least 10 N/mm$^2$.

For the preparation of such adhesives, coatings and foams, the polymers according to the invention comprising alkoxysilane end groups can be formulated by known processes together with conventional solvents, blowing agents, plasticizers, fillers, pigments, flameproofing agents, desiccants, additives, light stabilizers, antioxidants, thixotropy agents, catalysts, adhesion promoters and optionally further auxiliary substances and additives.

Typical foams and adhesive and coating preparations according to the invention comprise, for example, 5 wt. % to 100 wt. % of a polymer modified with alkoxysilane groups, according to claim 1, or of a mixture of two or more such polymers modified with alkoxysilane groups, up to 50 wt. % of a plasticizer/flameproofing agent or of a mixture of two or more plasticizers/flameproofing agents, up to 95 wt. % of a solvent/blowing agent or of a mixture of two or more solvents/blowing agents, up to 20 wt. % of a moisture stabilizer or of a mixture of two or more moisture stabilizers, up to 5 wt. % of one or more antiageing agents, up o 5 wt. % of a catalyst or of a mixture of two or more catalysts and up to 80 wt. % of a filler or of a mixture of two or more fillers.

Suitable plasticizers which may be mentioned by way of example are phthalic acid esters, adipic acid esters, alkylsulfonic acid esters of phenol, phosphoric acid esters or also higher molecular weight polypropylene glycols.

Flameproofing agents which can be employed are the typical halogen- or phosphorus-containing compounds, and likewise inorganic flameproofing agents, such as, for example, aluminium oxide hydrate.

In the simplest case, air or nitrogen can be employed as a blowing agent, but all other blowing agents known per se from polyurethane chemistry can of course also be employed for foaming the composition according to the invention. Examples which may be mentioned are n-butane, i-butane, propane and dimethyl ether, as well as mixtures of the abovementioned agents.

Desiccants which may be mentioned are, in particular, alkoxysilyl compounds, such as vinyltrimethoxysilane, methyltrimethoxysilane, i-butyltrimethoxysilane, hexadecyltrimethoxysilane.

Suitable fillers which may be mentioned by way of example are carbon black, precipitated silicas, pyrogenically produced silicas, mineral chalks and precipitated chalks or also fibrous fillers.

Thixotropy agents which may be mentioned by way of example are pyrogenically produced silicas, polyamides, hydrogenated castor oil secondary products or also polyvinyl chloride.

Suitable catalysts which can be employed for curing of the adhesives, coatings or foams according to the invention are all the organometallic compounds and aminic catalysts which are known to promote silane polycondensation. Particularly suitable organometallic compounds are, in particular, compounds of tin and of titanium. Preferred tin compounds are, for example: dibutyltin diacetate, dibutyltin dilaurate, dioctyltin maleate and tin carboxylates, such as, for example, tin(II) octoate or dibutyltin bis-acetoacetonate. The tin catalysts mentioned can optionally be used in combination with aminic catalysts, such as aminosilanes or 1,4-diazabicyclo[2.2.2]octane. Preferred titanium compounds are, for example, alkyl titanates, such as diisobutylbisacetoacetic acid ethyl ester titanate. Aminic catalysts which are suitable for sole use are, in particular, those which have a particularly high base strength, such as amines having an amidine structure. Preferred aminic catalysts are therefore, for example, 1,8-diazabicyclo[5.4.0]undec-7-ene or 1,5-diazabicyclo[4.3.0]non-5-ene. Brønstedt acids may also catalyse the silane condensation. All acids which are compatible with the particular formulation can be employed. There are mentioned here by way of example p-toluenesulphonic acid, dodecylbenzenesulphonic acid or also citric acid.

Adhesion promoters which are employed are the known functional silanes, such as, for example, aminosilanes of the abovementioned type, but also N-aminoethyl-3-aminopropyltrimethoxy- and/or N-aminoethyl-3-aminopropylmethyldimethoxysilane, epoxysilanes and/or mercaptosilanes.

The following examples illustrate the present invention without limiting it.

EXAMPLES

Unless stated otherwise, all the percentage data relate to percent by weight (wt. %).

The ambient temperature of 23° C. prevailing at the time the experiments were carried out is called RT (room temperature).

The methods described below for the determination of the corresponding parameters were used for carrying out and evaluating the examples and are also the methods in general for determination of the parameters relevant according to the invention.

Determination of the Isocyanate Content

The determination of the NCO contents in wt. % was carried out in accordance with DIN EN ISO 11909 by back-titration with 0.1 mol/l of hydrochloric acid after reaction with butylamine.

Determination of the Viscosity

The viscosity measurements were carried out in accordance with ISO/DIN 3219:1990 at a constant temperature of 23° C. and a constant shear rate of 250/sec using a plate-cone rotary viscometer of the Physica MCR type (Anton Paar Germany GmbH, Ostfildern, DE) using the CP 25-1 measuring cone (25 mm diameter, 1° cone angle).

Example 1

According to the Invention

In a 2 l sulfonating beaker with a lid, stirrer, thermometer and nitrogen flow, 732.3 g of polypropylene glycol having a hydroxyl number of 89 mg of KOH/g and having 20 wt. % of SAN dispersed therein, and 0.05 g of dibutyltin dilaurate (Desmorapid® Z, Bayer MaterialScience AG) were heated to 60° C. 267.8 g of 3-isocyanatopropyltrimethoxysilane were then added at 60° C. and the mixture was stirred until the theoretical NCO content of 0.05% was reached. The excess NCO was taken up by addition of methanol. The polyurethane polymer containing alkoxysilane end groups which was obtained had a viscosity of 1,200 mPas (23° C.).

Example 2

According to the Invention

In a 2 l sulfonating beaker with a lid, stirrer, thermometer and nitrogen flow, 904.5 g of polyether triol built up from propylene oxide and ethylene oxide (12 wt. %) and having a hydroxyl number of 28.2 mg of KOH/g and 45 wt. % of SAN dispersed therein, and 0.05 g of dibutyltin dilaurate (Desmorapid® Z, Bayer MaterialScience AG) were heated to 60° C. 95.6 g of 3-isocyanatopropyltrimethoxysilane were then added at 60° C. and the mixture was stirred until the theoretical NCO content of 0.05% was reached. The excess NCO was taken up by addition of methanol. The polyurethane polymer containing alkoxysilane end groups which was obtained had a viscosity of 12,550 mPas (23° C.).

Example 3

According to the Invention

In a 2 l sulfonating beaker with a lid, stirrer, thermometer and nitrogen flow, 902.3 g of polyether triol built up from propylene oxide and ethylene oxide (13 wt. %) and having a hydroxyl number of 29 mg of KOH/g and 20 wt. % of SAN dispersed therein, and 0.05 g of dibutyltin dilaurate (Desmorapid® Z, Bayer MaterialScience AG) were heated to 60° C. 97.7 g of 3-isocyanatopropyltrimethoxysilane were then added at 60° C. and the mixture was stirred until the theoretical NCO content of 0.05% was reached. The excess NCO was taken up by addition of methanol. The polyurethane polymer containing alkoxysilane end groups which was obtained had a viscosity of 6,200 mPas (23° C.).

Example 4

According to the Invention

In a 2 l sulfonating beaker with a lid, stirrer, thermometer and nitrogen flow, 902.3 g of polyether triol built up from propylene oxide and ethylene oxide (13 wt. %) and having a hydroxyl number of 28.5 mg of KOH/g and 20 wt. % of PHD dispersed therein, and 0.05 g of dibutyltin dilaurate (Desmorapid® Z, Bayer MaterialScience AG) were heated to 60° C. 97.7 g of 3-isocyanatopropyltrimethoxysilane were then added at 60° C. and the mixture was stirred until the theoretical NCO content of 0.05% was reached. The excess NCO was taken up by addition of methanol. The polyurethane polymer containing alkoxysilane end groups which was obtained had a viscosity of 12,500 mPas (23° C.).

Example 5

According to the Invention

In a 2 l sulfonating beaker with a lid, stirrer, thermometer and nitrogen flow, 841.2 g of polyether tetrol started on ethylenediamine, built up from propylene oxide and having a hydroxyl number of 50.2 mg of KOH/g and 20 wt. % of SAN dispersed therein, and 0.05 g of dibutyltin dilaurate (Desmorapid® Z, Bayer MaterialScience AG) were heated to 60° C. 158.8 g of 3-isocyanatopropyltrimethoxysilane were then added at 60° C. and the mixture was stirred until the theoretical NCO content of 0.05% was reached. The excess NCO was taken up by addition of methanol. The polyurethane polymer containing alkoxysilane end groups which was obtained had a viscosity of 4,700 mPas (23° C.).

Example 6

According to the Invention

In a 2 l sulfonating beaker with a lid, stirrer, thermometer and nitrogen flow, 692.5 g of polyether triol started on triethanolamine, built up from propylene oxide and having a hydroxyl number of 119 mg of KOH/g and 20 wt. % of SAN dispersed therein, and 0.05 g of dibutyltin dilaurate (Desmorapid® Z, Bayer MaterialScience AG) were heated to 60° C. 307.5 g of 3-isocyanatopropyltrimethoxysilane were then added at 60° C. and the mixture was stirred until the theoretical NCO content of 0.05% was reached. The excess NCO was taken up by addition of methanol. The polyurethane polymer containing alkoxysilane end groups which was obtained had a viscosity of 2,900 mPas (23° C.).

Example 7

According to the Invention

In a 2 l sulfonating beaker with a lid, stirrer, thermometer and nitrogen flow, a mixture of 500.0 g of polypropylene glycol having a hydroxyl number of 112 mg of KOH/g, 500.0 g of polyether triol built up from propylene oxide and ethylene oxide (12 wt. %) and having a hydroxyl number of 28.2 mg of KOH/g and 45 wt. % of SAN dispersed therein, and 0.03 g of dibutyltin dilaurate (Desmorapid® Z, Bayer MaterialScience AG) were heated to 60° C. 263.8 g of 3-isocyanatopropyltrimethoxysilane were then added at 60° C. and the mixture was stirred until the theoretical NCO content of 0.05% was reached. The excess NCO was taken up by addition of methanol. The polyurethane polymer containing alkoxysilane end groups which was obtained had a viscosity of 1,900 mPas (23° C.).

Example 8

According to the Invention

In a 5 l sulfonating beaker with a lid, stirrer, thermometer and nitrogen flow, a mixture of 1,227.9 g of polypropylene glycol having a hydroxyl number of 112 mg of KOH/g, 1,227.9 g of polyether triol built up from propylene oxide and ethylene oxide (12 wt. %) and having a hydroxyl number of 28.2 mg of KOH/g and 45 wt. % of SAN dispersed therein, and 0.09 g of dibutyltin dilaurate (Desmorapid® Z, Bayer MaterialScience AG) were heated to 60° C. After addition of 130.5 g of hexamethylene-diisocyanate (Desmodur® H, Bayer MaterialScience AG), the mixture was stirred at 60° C. until no further NCO content was to be detected titrimetrically. 392.4 g of 3-isocyanatopropyltrimethoxysilane were then added at 60° C. and the mixture was stirred until the theoretical NCO content of 0.05% was reached. The excess NCO was taken up by addition of methanol. The polyurethane polymer containing alkoxysilane end groups which was obtained had a viscosity of 13,800 mPas (23° C.).

Comparative Example 1

In a 3 l sulfonating beaker with a lid, stirrer, thermometer and nitrogen flow, 2,070.3 g of polyether triol built up from propylene oxide and ethylene oxide (13 wt. %) and having a hydroxyl number of 56 mg of KOH/g and 0.07 g of dibutyltin dilaurate (Desmorapid® Z, Bayer MaterialScience AG) were heated to 60° C. 409.2 g of 3-isocyanatopropyltrimethoxysilane were then added at 60° C. and the mixture was stirred until the theoretical NCO content of 0.05% was reached. The excess NCO was taken up by addition of methanol. The polyurethane polymer containing alkoxysilane end groups which was obtained had a viscosity of 1,900 mPas (23° C.).

Comparative Example 2

In a 4 l sulfonating beaker with a lid, stirrer, thermometer and nitrogen flow, 2,651.7 g of polyether triol built up from propylene oxide and ethylene oxide (18 wt. %) and having a hydroxyl number of 35 mg of KOH/g and 0.09 g of dibutyltin dilaurate (Desmorapid® Z, Bayer MaterialScience AG) were heated to 60° C. 353.2 g of 3-isocyanatopropyltrimethoxysilane were then added at 60° C. and the mixture was stirred until the theoretical NCO content of 0.05% was reached. The excess NCO was taken up by addition of methanol. The polyurethane polymer containing alkoxysilane end groups which was obtained had a viscosity of 2,100 mPas (23° C.).

Use Examples

To evaluate the use properties of the various polymers, these were processed into the following formulation:

| | Amount employed in wt. % |
|---|---|
| Polymer | 46.06 |
| Filler (Socal ® $U_1S_2$) | 49.75 |
| Desiccant (Dynasylan ® VTMO) | 2.76 |

-continued

| | Amount employed in wt. % |
|---|---|
| Adhesion promoter (Dynasylan ® 1146) | 1.38 |
| Catalyst (Lupragen ® N700) | 0.05 |

For preparation of the formulation, the filler (Socal® U1S2; Solvay GmbH) and the desiccant (Dynasylan® VTMO; Evonik AG) are added to the polymer as binders and the components are mixed in a vacuum dissolver with a wall scraper at 3,000 rpm. The adhesion promoter (Dynasylan® 1146; Evonik AG) is then added and is stirred into the mixture at 1,000 rpm in the course of 5 min. Finally, the catalyst (Lupragen® N700; BASF SE) is stirred in at 1,000 rpm and in conclusion the finished mixture is deaerated in vacuo.

Determination of the Skin Formation Time

A film of the adhesive is applied by means of a doctor blade (200 μm) to a glass plate cleaned beforehand with ethyl acetate, and is immediately laid in the Drying Recorder. The needle is loaded with 10 g and moves over a distance of 35 cm over a period of 24 hours.

The Drying Recorder is in a climatically controlled room at 23° C. and 50% rel. atmospheric humidity.

The point in time of disappearance of the permanent trace of the needle from the film is stated as the skin formation time.

The skin formation time was determined 1 day after the preparation of the corresponding formulation.

Determination of the Tensile Shear Strength

For determination of the tensile shear strength, singly overlapped test specimens of beech having an overlapping length of 10 mm are used. The pieces of beech wood required for this have the following dimensions: length=40 mm, width=20 mm, thickness=5 mm. The test specimens are pressed for 24 h at 23° C. and 50% rel. atmospheric humidity under a pressure of 0.7 N/mm² and then stored for 7 days at 23° C. and 50% rel. atmospheric humidity, thereafter 20 days at 40° C. and in conclusion one day at 23° C. and 50% rel. atmospheric humidity.

The tensile shear strength is measured on a tensile tester at speed of advance of 100 mm/min.

The following table shows the results obtained:

| | Comp. 1 | Comp. 2 | | |
|---|---|---|---|---|
| Tensile shear strength [N/mm²] | 8.8 | 8.0 | | |
| Skin formation time [min] | 45 | 30 | | |

| | Ex. 1 | Ex. 2 | Ex. 3 | Ex. 4 |
|---|---|---|---|---|
| Tensile shear strength [N/mm²] | 11.0 | 10.8 | 11.2 | 11.6 |
| Skin formation time [min] | 140 | 20 | 20 | 55 |

| | Ex. 5 | Ex. 6 | Ex. 7 | Ex. 8 |
|---|---|---|---|---|
| Tensile shear strength [N/mm²] | 12.2 | 12.3 | 12.0 | 10.9 |
| Skin formation time [min] | 65 | 60 | 60 | 30 |

The data determined clearly show the superiority of the examples according to the invention over the comparative examples during use.

The invention claimed is:

1. An adhesive composition comprising 5 wt. % to 100 wt. % of an alkoxysilane group-modified polymer or of a mixture of two or more such polymers modified with alkoxysilane groups wherein the polymer is obtained by reacting
    a) compounds or mixtures of compounds having isocyanate-reactive groups, which comprise at least 5 wt. % of organic filler dispersed therein, with
    b) an isocyanate-functional alkoxysilane compound of the general formula (I):

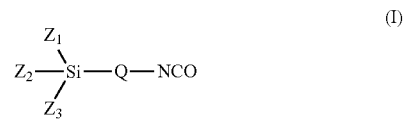

wherein
$Z_1$, $Z_2$, and $Z_3$ are identical or different $C_1$-$C_8$-alkoxy or $C_1$-$C_8$-alkyl radicals, which 10 can also be bridged, but wherein at least one $C_1$-$C_8$-alkoxy radical must be present on each Si atom,
Q is an at least difunctional linear or branched organic radical and
wherein the polymer has a viscosity at 23° C. of 13.8 Pas or less,
0 wt. % to 50 wt. % of a plasticizer/flameproofing agent or of a mixture of two or more plasticizers/flameproofing agents,
0 wt. % to 95 wt. % of a solvent/blowing agent or of a mixture of two or more solvents/blowing agents,
0 wt. % to 20 wt. % of a moisture stabilizer or of a mixture of two or more moisture stabilizers,
0 wt. % to 5 wt. % of an antiageing agent or of a mixture of two or more antiageing agents,
0 wt. % to 5 wt. % of a catalyst or of a mixture of two or more catalysts,
0 wt. % to 80 wt. % of a filler or of a mixture of two or more fillers
and
the adhesive has a tensile shear strength of greater than 10 N/mm².

2. The adhesive composition according to claim 1, wherein Q is an alkylene radical having 1 to 8 carbon atoms.

3. The adhesive composition according to claim 1, wherein the compounds or mixtures of compounds having isocyanate-reactive groups in part (a) comprise polyether polyols.

4. The adhesive composition according to claim 1, in which part a) comprises at least 20 wt. % of dispersed organic filler.

5. The adhesive composition according to claim 1, in which part a) comprises at least 15 wt. % of dispersed organic filler.

6. The adhesive composition according to claim 1, in which part a) comprises at least 10 wt. % of dispersed organic filler.

7. The adhesive composition according to claim 1, wherein the polymer has a viscosity at 23° C. of less than 10 Pas.

8. The adhesive composition according to claim 1, wherein the polymer had a viscosity at 23° C. of less than 5 Pas.

9. The adhesive composition according to claim 1, wherein the isocyanate-functional alkoxysilane compound has a molecular weight of from 140 g/mol to 500 g/mol.

10. The adhesive composition according to claim 1, wherein the isocyanate-functional alkoxysilane compound is isocyanatomethyltrimethoxysilane, isocyanatomethyltriethoxysilane, (isocyanatomethyl)-methyldimethoxysilane, (isocyanatomethyl)methyldiethoxysilane, 3-isocyanatopropyl-trimethoxysilane, 3-isocyanatopropylmethyldimethoxysilane, 3-isocyanatopropyltriethoxysilane and 3-isocyanatopropylmethyldiethoxysilane.

11. The adhesive composition according to claim 1, wherein the isocyanate-functional alkoxysilane compound is 3-isocyanatopropyltrimethoxysilane.

12. The adhesive composition according to claim 6, wherein the isocyanate-functional alkoxysilane compound is 3-isocyanatopropyltrimethoxysilane.

13. A substrate coated with the adhesive according to claim 1.

* * * * *